(12) United States Patent
Antonevich et al.

(10) Patent No.: US 11,487,521 B2
(45) Date of Patent: Nov. 1, 2022

(54) SYSTEM AND METHOD FOR SOURCE CODE TRANSLATION USING STREAM EXPRESSIONS

(71) Applicant: Next Pathway Inc., Toronto (CA)

(72) Inventors: Vladimir Antonevich, Toronto (CA); Badih Schoueri, Mississauga (CA); Qiang Yu, Richmond Hill (CA)

(73) Assignee: Next Pathway Inc., Toronto (CA)

( * ) Notice: Subject to any disclaimer, the term of this patent is extended or adjusted under 35 U.S.C. 154(b) by 0 days.

(21) Appl. No.: 16/808,133

(22) Filed: Mar. 3, 2020

(65) Prior Publication Data
US 2020/0285454 A1     Sep. 10, 2020

Related U.S. Application Data

(60) Provisional application No. 62/813,489, filed on Mar. 4, 2019.

(51) Int. Cl.
*G06F 8/51* (2018.01)
*G06F 8/41* (2018.01)

(52) U.S. Cl.
CPC .............. *G06F 8/51* (2013.01); *G06F 8/427* (2013.01)

(58) Field of Classification Search
CPC .................................. G06F 8/51; G06F 8/427
See application file for complete search history.

(56) References Cited

U.S. PATENT DOCUMENTS

| | | | |
|---|---|---|---|
| 6,738,967 B1* | 5/2004 | Radigan | G06F 8/47 717/146 |
| 8,387,029 B2* | 2/2013 | Bird | G06F 9/45508 717/143 |
| 2006/0271850 A1* | 11/2006 | Gombert | G06F 3/1284 715/234 |
| 2006/0277534 A1* | 12/2006 | Kasuya | G06F 30/3323 717/143 |
| 2009/0313613 A1* | 12/2009 | Ben-Artzi | G06F 8/51 717/137 |
| 2010/0083221 A1* | 4/2010 | Naik | G06F 8/72 717/108 |
| 2012/0204160 A1* | 8/2012 | Ben-Artzi | G06F 8/51 717/137 |

* cited by examiner

*Primary Examiner* — Wei Y Zhen
*Assistant Examiner* — Amir Soltanzadeh
(74) *Attorney, Agent, or Firm* — Kilpatrick Townsend & Stockton LLP

(57) ABSTRACT

A system and method to translate source code in a source language executable in a source computing system to a target language executable in a target computing system. Source code in the source language is parsed to generate a corresponding parse tree containing at least one tree node and at least one leaf. During traversal of the parse tree, at least one mutation script is applied. The mutation script directs at least one of: generating a stream expression comprising at least one token corresponding to values of the at least one node and the at least one leaf of the parse tree; and formulating at least one text output containing a text pattern specified in the mutation script and/or values of the at least one token. Source code in the target language is outputted based on the at least one text output.

18 Claims, 6 Drawing Sheets

SYSTEM AND METHOD FOR SOURCE CODE TRANSLATION USING STREAM EXPRESSIONS

RELATED APPLICATIONS

This application claims priority to U.S. Provisional Patent Application No. 62/813,489 filed on Mar. 4, 2019 entitled "System and Method for Source Code Translation Using Stream Expressions", which is incorporated herein by reference in its entirety.

TECHNICAL FIELD

The present disclosure relates generally to automated source code generation, and more specifically to a method and system to automatically translate source code from a first language to a second language.

BACKGROUND

Big Data is a term for data sets that are so large or complex that traditional data processing applications are inadequate to deal with data sets of this size. Data sets grow rapidly in part because of the increased use of sensing devices and networks, which operate as cheap and numerous sources of information. As a result, the world's technological per-capita capacity to store information has increased phenomenally.

Advancements in cloud-based technologies have enabled the establishment of highly versatile and scalable computing systems. Such systems are appealing to business users who desire to maintain and operate their corporate and enterprise data systems within distributed computing environments. As such, it is desirable to migrate existing data sets residing within legacy data systems to a cloud-based enterprise data lake or a cloud-based data platform to take advantage of the versatility and scalability of distributed computing systems.

The task of moving data to a cloud-based enterprise data lake or cloud-based data platform involves both moving the data as well as the various customized applications and processes that have been developed to manage and analyze the data. The task of migrating the applications and processes may be a challenge because it generally requires a translation of the corresponding source code which is often written in a programming language for execution by a legacy system into source code in a different programming language that can be executed by a target cloud-based system. Manual translation of source code can be a complex task that is often time-consuming and error-prone. Translation of source code by a team of developers may further introduce inconsistencies in respect of the potentially different coding styles and coding logic applied by each individual developer to translate the source code.

Accordingly, in view of the foregoing deficiencies, there is a need for a system and method to translate source code from a source language to a target language that addresses the above-noted disadvantages of existing code translation approaches.

SUMMARY OF THE DISCLOSURE

In general, the present specification describes a system and method to automatically translate source code from a source language to a target language.

According to a broad aspect of the invention, there is provided a computer-implemented method to automatically translate a source code in a source language executable in a source computing system to a target language executable in a target computing system, the method comprising: generating a parse tree of the source code in the source language, the parse tree having at least one node and at least one leaf; traversing the parse tree and applying at least one mutation script to the parse tree during traversal of the parse tree, the mutation script directing that at least one of the following steps be performed: generating a stream expression, the stream expression comprising at least one token corresponding to values associated with at least one of the at least one node and at least one leaf; and formatting at least one text output according to the target language, the at least one text output containing at least one of: (1) a text pattern specified within at least one mutation rule in the at least one mutation script and (2) the at least one token; and outputting the source code in the target language using the at least one text output.

In one embodiment of the method, the computer-implemented method further comprising the step of generating a translation report.

In one embodiment of the method, the translation report comprises at least one instance of a translation discrepancy indicating that a logic statement of the source code in the source language does not have a corresponding mutation.

In one embodiment of the method, the mutation script specifies the at least one mutation rule is applicable to a specified node within the parse tree.

In one embodiment of the method, the step of generating the stream expression comprises performing a bubble action at the specified node that bubbles token data upward along the parse tree from descendant nodes to the specified node.

In one embodiment of the method, the step of generating the stream expression comprises performing a bubble import action at the specific node that imports token data from at least one ascendant node to the specified node.

In one embodiment of the method, the mutation script is associated with a pair of target language and source language.

In one embodiment of the method, the step of traversing the parse tree comprises navigating the parse tree in a bottom-first, left-first order.

In one embodiment of the method, the source code in the source language is not executable by the target computing system.

According to another broad aspect of the invention, there is provided a system to automatically translate source code in a source language executable in a source computing system to a target language executable in a target computing system, the system comprising: a source file parser for generating a parse tree of the source code in the source language, the parse tree having at least one node and at least one leaf; and a code mutator for outputting the source code in the target language by traversing the parse tree and applying at least one mutation script to the parse tree during traversal of the parse tree, the mutation script directing that at least one of the following steps be performed: generating a stream expression, the stream expression comprising at least one token corresponding to values associated with at least one of the at least one node and at least one leaf; and formatting at least one text output according to the target language, the at least one text output containing at least one of: (1) a text pattern specified within at least one mutation rule in the at least one mutation script and (2) the at least one token; where the source code in the target language is outputted using the at least one text output.

In one embodiment of the system, the system further comprises a report generator for outputting a translation report.

In one embodiment of the system, the translation report comprises at least one instance of a translation discrepancy indicating that a logic statement of the source code in the source language does not have a corresponding mutation.

In one embodiment of the system, the mutation script specifies the at least one mutation rule applicable to a specified node within the parse tree.

In one embodiment of the system, the stream expression is generated by performing a bubble action at the specified node that bubbles token data upward along the parse tree from descendant nodes to the specified node.

In one embodiment of the system, the stream expression is generated by performing a bubble import action at the specific node that imports token data from at least one ascendant node to the specified node.

In one embodiment of the system, the mutation script is associated with a pair of target language and source language.

In one embodiment of the system, traversing the parse tree comprises navigating the parse tree in a bottom-first, left-first order.

In one embodiment of the system, the source code in the source language is not executable by the target computing system.

Additional aspects of the present invention will be apparent in view of the description which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

Figure 1:
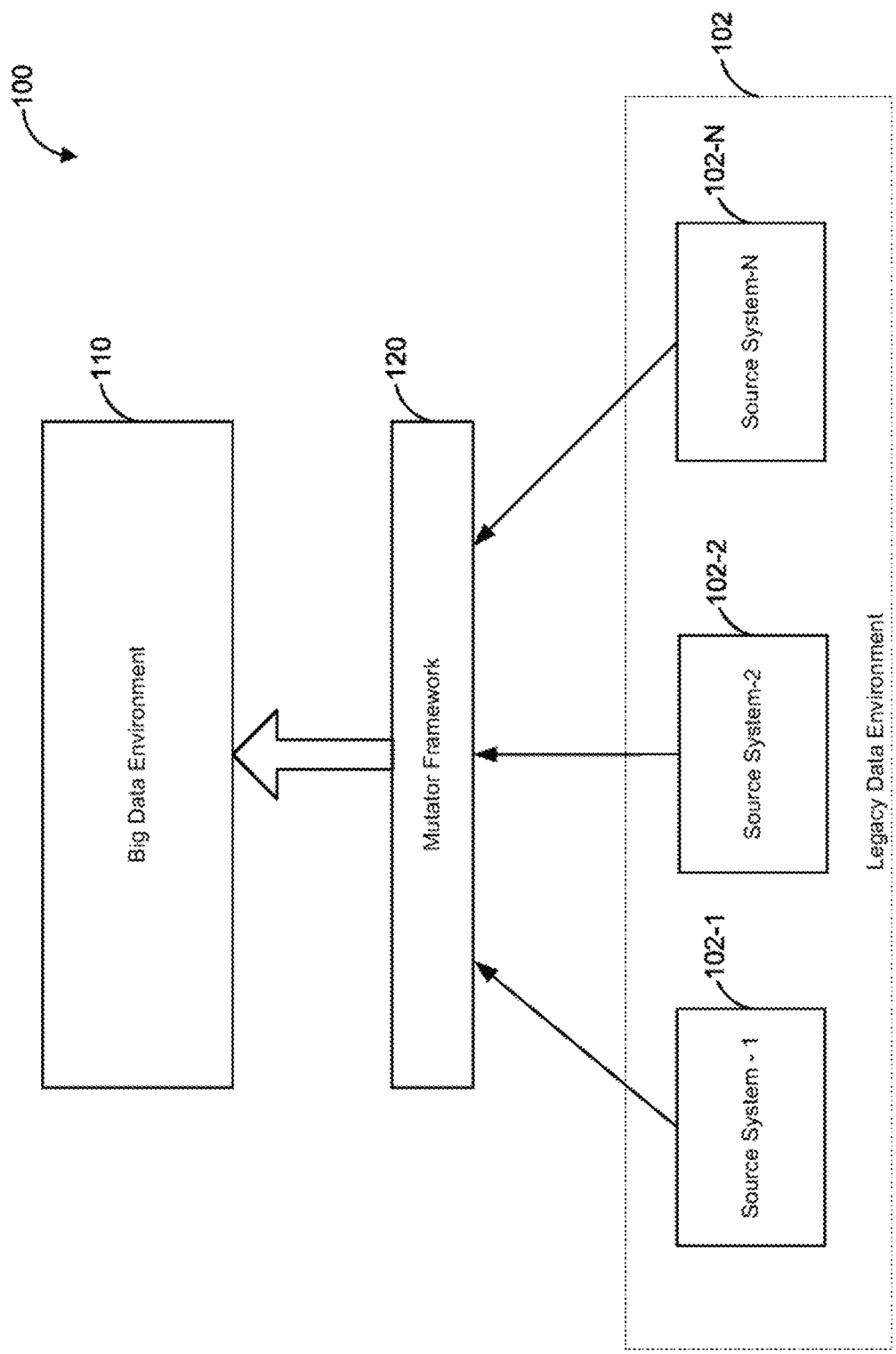
FIG. 1 is a block diagram of an architecture of a code mutator framework operable to translate source code from a source language to a target language.

The description which follows, and the embodiments described therein, are provided by way of illustration of examples of particular embodiments of the principles of the present invention. These examples are provided for the purposes of explanation, and not limitation, of those principles and operation of the invention.

Legacy data solutions are tightly integrated into critical business processes. For example, businesses and enterprises often develop many custom reporting or process applications (e.g. in the form of SQL, stored procedures and application code) to manage data stored within their existing (i.e. legacy) data warehouses in order to support their operations. It is often difficult to separate the data and the business processes and applications written to manage the data. In order to move this data and their corresponding applications to modern big data environments, which uses systems and frameworks known by the trademarks Hadoop™, SparQ™ and R™, the source code for existing applications often has to be translated into a language that can be executed in these modern systems. As such, large scale data migration projects become costly, time-consuming, and expose the business to operational risks such as downtime. The manual identification and translation of applications written in SQL and Extract Transform and Load (ETL) code, and existing analytical and reporting workloads, to a target language that can run within big data environments is complicated, time-consuming, and error-prone. As such, the rebuilding all of these applications can be daunting and often leads to data migration projects failing as a result of the time and cost required for such source code translation.

Disclosed herein is a system and method, and more specifically, a source code mutator framework, operable to automatically translate source code for legacy data warehouse applications and workloads into modern languages that can be run natively within big data environments with speed, consistency and reduced manual coding. As will be explained further subsequently, the mutator framework provides automated logic translation, and identification translation of underlying procedural and SQL queries from legacy scripts and languages into modern languages (e.g. Spark™ SQL/HQL).

The inventors have discovered that the automation of source code translation can cover up to 80% of the conversion effort (e.g. able to successfully translate up to 80% of the logic statements of the source code in the source language), thereby reducing the time required to complete a data migration project and the overhead costs. The mutator framework as described herein can be expected to relieve the need for developers to have in-depth knowledge of both source and target languages. Furthermore, the mutator framework is expected to allow for continuous improvement of code translations by permitting developers to review existing mutation (i.e. translation) rules and refine them for future re-use on new projects.

Referring first to FIG. 1, shown therein is a block diagram of an architecture 100 containing a mutator framework 120 that can be used to translate the application source code of a legacy data environment 102 for deployment in a big data environment 110. The legacy data environment 102 generally contains a number of legacy data systems. Depicted in FIG. 1 are N source systems 102-1 to 102-N representing legacy source systems containing legacy repositories for storing data and associated applications, and reporting procedures and processes that are generally incompatible with the data systems and application environments of the big data environment 110. For example, the associated applications, reporting procedures and processes cannot run natively inside the big data environment 110.

During operation, existing source code associated with the legacy source systems 102-1 to 102-N are imported into the mutator framework 120 from data repositories (not shown) within the legacy data environment 102. The source code can correspond to reporting procedures and enterprise data warehouse (EDW) application code. The source code is translated into a programming language by the mutator framework 120 that can run natively within the big data environment 110.

Figure 2:
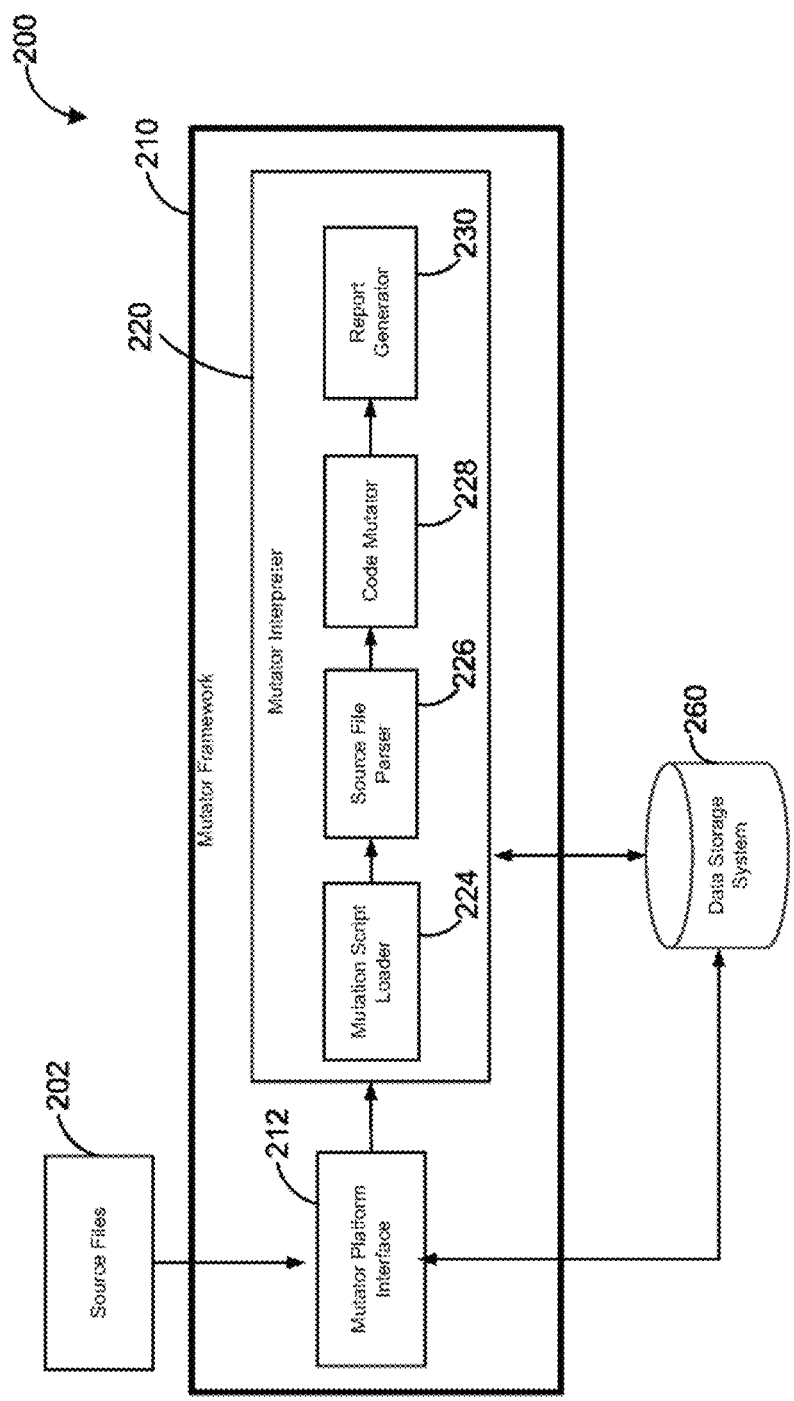
FIG. 2 is a block diagram depicting the architecture of the mutator framework of FIG. 1.

FIG. 2 is a block diagram depicting an architecture 200 and a data flow of a mutator framework 210 according to one embodiment of the invention for automating source code translation from a source language to a target language in which the target language is executable within big data environment 110 of FIG. 1. The mutator framework 210 provides for flexible parsing and scripted translation (i.e. mutation) of source code in the source language to a target language. The platform 200 can be hosted on a local or on-premises computing system or on a distributed or cloud-based environment located remotely at a data center (e.g. Google Cloud Services or Amazon™ Web Service). In both cases, the mutator platform 210 can be implemented as a server-side application with suitable interfaces to enable communication and data transfer with external hardware and software systems.

The mutator framework 210 provides a mutator framework interface 212 to allow a user to import source files 202 containing source code in the source language (the "source text") for translation, and manage a source code translation project. For example, a web-based graphical user interface ("GUI") application can be provided to allow users such as project owners or developers to conduct administrative tasks such as specifying the target language or reviewing translation reports. Alternatively or concurrently, the mutator framework 210 is operable to provide a command-line interface to carry out the code translation process as well as offer other command line functions such as command-line grammar tree viewer that renders a parse tree of the parsed source text and visualizes the text graphically as a parsed tree.

A mutator interpreter 220 is provided as a module within the mutator framework 210 and is operable to carry out the process of code translation. Each step of the translation process is illustrated within the mutator interpreter 220 as a component, as shown in FIG. 2. A description of each component is now presented.

A mutation script loader component 224 is operable to load mutation scripts which contain statements that govern the manner in which the source text is translated to the target language. Mutation scripts corresponding to particular pairs of programming languages are provided. For example, language pairs can include, but are not limited to, C and Java™, Netezza™ and Hive™, Informatica Powermart™ and SQL™, SAS™ and R™, Teradata™ and Hive™, and the like.

Mutation scripts can be written ahead of time and stored for use. A repository of mutation scripts can be stored within a data storage system 260. In some embodiments, the data storage system 260 is a Git™ repository. Alternatively the user can specify a location of the mutator scripts for retrieval by way of the interface 212. For example, the mutation scripts may be stored in a different storage system, so the network location of that storage system may be provided by the user. In some embodiments, the mutation script repository contains two separate sub-modules: a first sub-module that defines mutation rules structured per version of the source and target language with an optional common part; and a second sub-module containing verification tests per version of source and target language with operation common parts. A description of the structure and function mutator scripts will be provided in greater detail subsequently.

A source file parser component 226 is operable to parse the source text. The parsing can be completed based on a suitable grammar file format such as ANTLR4™ complied grammar .g4 files containing predefined grammars for a particular source language (e.g. SQL™, SAS™, Powermart™ predefined grammars) or other grammar files known to those in the art. For example, the grammar files can be generated out of a common master grammar.g4 file (MasterGrammar.g4) which can be pre-processed into a dialect-specific version for importation as a dialect grammar file. For instance, a Netezza.g4 grammar file for producing a Netezza lexer and parser, can include MasterGrammar.g4 which can be a customized version of the actual file, where all non-applicable statements are skipped.

Using the grammar file, the source file parser component 226 generates a parse tree containing nodes, branches and leaves. Nodes within the parse tree may have one or more child nodes. Each node and leaf can contain information such as text or numbers, herein referred to as "tokens".

A code mutator component 228 is operable to traverse the parse tree of the source text generated by the source file parser component 226 and apply the mutation scripts to one or more of the nodes of the parse tree. More specifically, from a particular node, the code mutator component 228 navigates the parse tree in a bottom-first, left-first order. For example, the child nodes of the particular node are processed from first to last (hence left-first) and if any child node has any sub-child nodes (i.e. grandchild nodes), they are iterated before the node itself (i.e. bottom-first). The code mutator component 228 does not modify the parse tree during traversal. Instead, the tokens of the parse tree are gathered and flattened into a one-dimensional array to create a stream expression.

More specifically, a stream expression defines a sequence of tokens (e.g. values obtainable from the leaves and nodes of a parse tree) used for insertion into the output of the code mutator component 228, the output being source code in the target language ("target text"). The stream expression can also be modified (i.e. by removing tokens that are not needed or re-arranging the sequence of tokens), according to the mutation rules in the mutation script, to output the target text. Additional details regarding parse tree traversal, stream expressions and application of mutation rules will be described in greater detail below.

A report generator module 230 outputs a report of the source code translation process. The report can contain indications of translation discrepancies to inform the user that a particular statement in the source text may not have been suitably translated, for example, because there was no suitable mutation rule that covers the particular source logic statement to translate that logic statement to an equivalent statement in the target language. In response, a developer can provide the suitable translations manually for the previously un-recognized logic statement. Such manually-provided translations can be added into the mutation scripts as a new mutation rule so that future instances of the logic statement can be translated and would no longer be flagged as a discrepancy.

Mutation Scripts

A mutation script can be regarded as a sequence of logic statements (e.g. commands to bubble data, compare data, etc) including template definitions, template aliases and mutation rules. The code mutator component 228 executes the mutation script logic and mutation rules defined within the script to translate source text to the target text. As noted above, the rules within the mutation script are intended for a specific pair of source and target languages, so that the rules define how particular logic statements in the source language should be translated to the target language. The mutation scripts and mutation rules defined therein are applied to a parse tree representation of the source text (described below).

Mutation rules define a set of conditions and corresponding action statements (e.g. translations/mutations) applicable to a node in a parse tree representing the source text. The source text is parsed according to the grammar of the source language to generate a corresponding parse tree. The mutation rules are also generated according to the grammar of the source language so as to allow for common references to the nodes of the parse tree to be made. Based on the grammar of the source text, the mutation rules include templated language in the target language for generating output of the source text for a particular logic statement in the source language.

The mutation script specifies how the tokens within the parse tree are gathered and how the mutation rules are applied. For example, some embodiments, a mutation rule can use the following syntax:

```
at <node_name>
when <condition>
when ... /* zero or more conditions are possible*/ {
/* zero or more statements in the body of the mutation rule */
}
```

In the above example syntax, the statement "at node_name" specifies the node within the parse tree to which mutation rule is applicable. The statement "when <condition>" is used to set conditions for which the action statements of the mutation rule would be invoked. Conditional statements used with the "when" keyword can include, but are not limited to, whether a node is a child or child of a child at any level of a parse tree; whether a particular token with a value equal to, lesser than or greater than a given reference value is found; whether the content of a result of a parse tree evaluation matches a particular regular expression or whether or not the result is empty; or any other logical expression that allows for an assessment of the applicability of an element.

During traversal of a parse tree of the source text by the mutator component 228, the tree traversal process would encounter various leaves and nodes within the tree. Upon reaching a node for which mutation rules apply, mutation rule conditions are evaluated. If, during the evaluation, that all conditions apply, one or more action statements within the rule are executed to apply actions to currently accumulated result of tree parsing.

Statements within a mutation rule can cause the code mutator component 228 to carry out tasks related to source text translation. Supported statements provide for actions such as result modifications, bubbling of computed values up along the parse tree, statistics generation, and the like. Statements related to translation reporting can also be provided. For example, a "discrepancy" action statement can be made available to generate discrepancies in the translation report to provide tag attributes to indicate whether a particular line of source text requires user review. A discrepancy can occur where a suitable mutation rule is not available to translate a particular logic statement in the source text to the target language. As such, the logic statement in the source text with the discrepancy would be flagged for review in the translation report.

An example translation rule applicable at a tree node named "contents" is presented below to output Java code for a Java class "Main" and prints out text according to the Java method System.out.println( ) using tokens stored in the element "item" is as follows:

```
at contents {
    LABEL: at position 0
    remove remaining tokens
    then insert 'public class Main {\n'
```

```
    ' public void main(String[ ] argv) {\n'
    stmnt(item ->
    ' int ' item ';\n'
    ' System.out.println('" item[0] '=" + item[0]'); \n'
    ' }\n'
    '}\n'
}
```

The mutation rule example provides for forming of the output text and can be used in conjunction with stream expressions to format the output in the target language in a model-view fashion. The rule can include pre-formed code patterns such as "public void main(String[ ] argv)" in the target language, as shown above in the example, and may contain placeholders in which data from the stream expressions can be used to populate these placeholders. In the present case, the element "item" recited in the mutation rule corresponds to the placeholders provided in pre-formed code pattern, and "stmt" corresponds to a stream expression containing the tokens for insertion into the placeholders Commonly used translation logic or translation statements can be packaged into a template for instantiation in a manner similar to the packaging of common programming logic statements into a method or function. A template name can be prefixed with a capitalized 'T' to indicate that a the translation logic corresponds to a mutation script template. For example, a template for the statements used in the above-noted mutation rule can take the following form:

```
T_PRINT =>    'public class Main {\n'
              ' public void main(String[ ] argv) {\n'
              items(item ->
              ' int ' item ';\n'
              ' System.out.println('" item[0] '=" + '
              item[0] ');\n')
              ' }\n'
              '}\n'
```

The "T" prefix of "T_PRINT" can be used to indicate that the body of code corresponds to a template. The template can be invoked by calling T_PRINT (items=>stmnt) where the parameter "items" corresponds to the placeholders provided in the template, and "stmt" corresponds to a stream expression containing the tokens for insertion into the placeholders. The parameter stmt can be generated by way of bubbling the data up the parse tree using the action statement "bubble result as stmt". An example combining the use of bubble statements is presented below. Invoking the template would output a Java class "Main" and prints out text according to the Java method System.out.println( ).

The template can be expanded by iterating over its own definition and inserting provided stream expressions. For example, the Java method System.out.println( ) can be repeated multiple times to generate multiple lines of target text for printing to an output if there are multiple lines of source text indicating the same function and/or logic.

Template aliases can be defined to function as convenient shorthand for redirecting to another template without the need to actually define template expressions and their parameters.

The mutation script can be structured in any desirable manner. For example, the organization of templates, template aliases, and mutation rules can be organized or grouped into logically related units, such as within the same file. That way, the overall complexity can be reduced and the resulting mutation script would be easier to develop and maintain.

However, the decision of how granular mutation rules are organized per file can be decided by the developer. As such, the developer can choose to place all mutation scripts containing various mutation rules in a single file and execute the script that way.

Parse Tree Navigation

A description of the parse tree navigation carried out by the code mutator component 228 is now presented. As noted previously, the code mutator component 228 navigates a parse tree generated by the source file parser module 226 in a bottom-first, left-first order. Mutation rules can be applied to the nodes of the parse tree as the mutator component 228 visits a node along the parse tree.

An example tree navigation carried out by the code mutator component 228 is presented, using a simple grammar for a hypothetical source language containing the following grammar, and covering programming statements involving the addition of two variables:

```
grammar Example;
contents: stmnt* EOF;
stmnt: ID '=' expr;
expr: INTEGER | expr '+' expr;
INTEGER: ('0'..'9')+;
ID: ('a'..'z')+;
SPACES: [ \u000B\t\r\n] -> channel(HIDDEN);
```

Figure 3A:
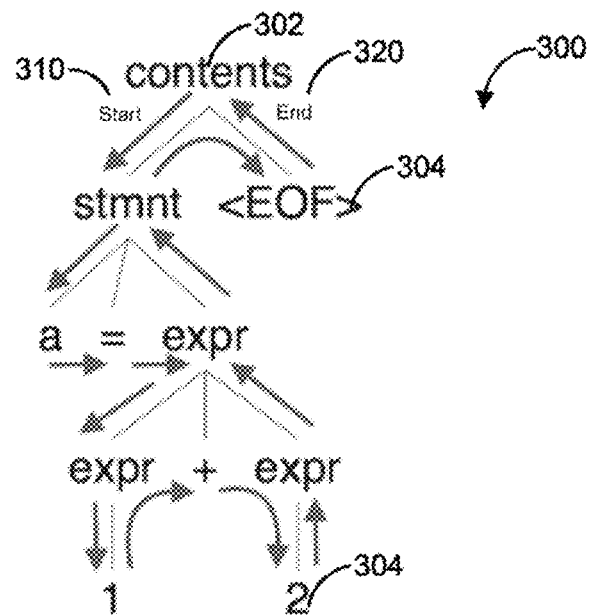
FIGS. 3A, 3B and 3C are examples of a first parse tree produced by parsing a set of source text and, traversal of said parse tree.

For a given source text "a=1+2", a corresponding parse tree 300 as shown in FIG. 3A can be generated by the source file parser 226. The parse tree includes a root node 302 represented by the text "contents" and various leaves 304. The parse tree is parsed from the start position 310, then following the arrows in a bottom-first and left-first manner until it reaches the end position 320. As shown in FIG. 3A, the tree contains nodes such as "stmt" and leaves such as "<EOF>" which correspond to elements defined in the grammar. Some nodes are connected to descendant nodes via branches while others nodes are not. Nodes without children can be called "leaves". The values stored at each node and leaf can be regarded as a "token".

The indicated order in which the parse tree 300 is traversed implies that any parent node has access only to data gathered/supplied by its descendants. In the present embodiment, the code mutator component 228 does not provide a method to query data from the parent node to any other tree node or leaf. Modifications are executed at the time of tree traversal and therefore the result is not guaranteed to have a parsable structure at all. Instead of querying, the code mutator component 228 provides for delivering data to the parent node from descendant nodes in a process called "bubbling". A "bubble" is a way to send data upstream within a parse tree to an ancestor node. In some embodiments, the propagation can be limited to one level only or it can be stopped explicitly further upstream. The content of any node/leaf can bubble up the parse tree 300. The node parent or any ancestor receives the bubble which can then be used to format an output for that node. At any given node, a bubble action statement can be invoked (e.g. as specified in the mutation script) to bubble data from descendant nodes upstream. An example showing the use of the bubble statement is presented subsequently.

Figure 3B:
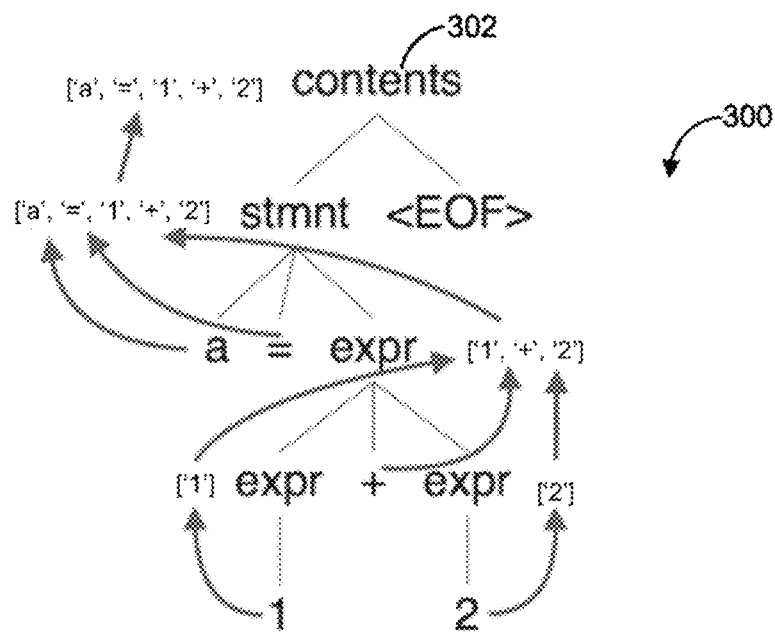

The process of bubbling data (i.e. tokens) results in a flattening of the parse tree 300. As noted previously, the code mutator component 228 does not modify the parse tree 300 as it traverses along the various branches and nodes. Instead, the tokens of the tree are gathered, for example by way of bubbling, to obtain a flattened one-dimensional array. Specifically, if a node bubbles up its result, then any bubble it receives can be queried. The bubbles can merge at the parent node and therefore can be thought of as an array. For example, the arrows shown in FIG. 3B depict the manner in which the tokens of the parse tree 300 are collected and delivered to the root node 302. At the root node 302, the following array of tokens is available upon traversal:
['a', '=', '1', '+', '2']
The above array is a form of a stream expression referring to a stream of tokens generated during tree traversal.

Figure 3C:
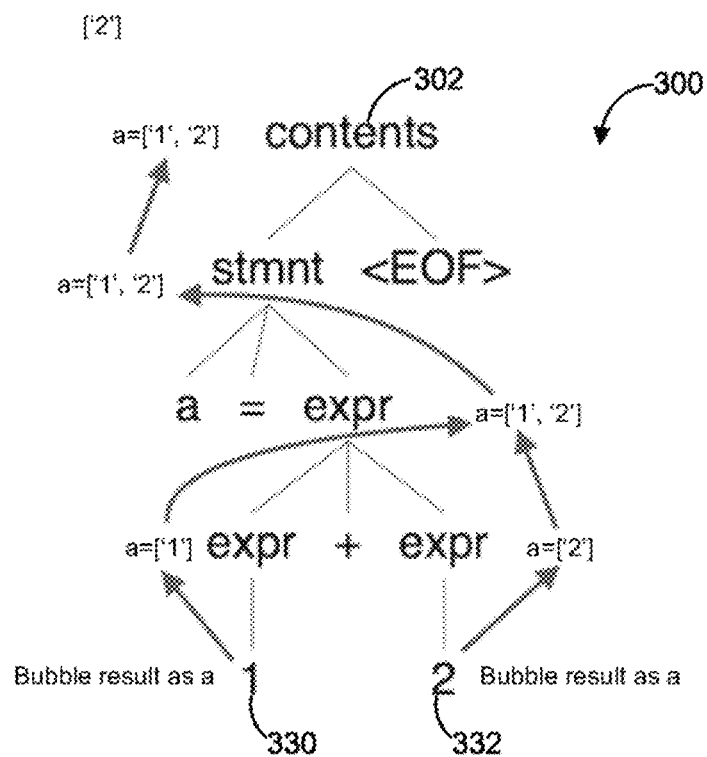

To facilitate modifications of the generated stream for the purpose of outputting the stream tokens (i.e. values) to the target language, additional data can be sent upstream (i.e. bubble) from child to parent as well as from all descendant nodes. FIG. 3C depicts how the bubbling process operates and the tokens being bubbled upstream. The expression stream tokens can be invoked by way of a bubble action statement within a mutation script directing the code mutator component 228 to send upwards a current result as evaluated for the current node. For example, the following action statement can be invoked to trigger the bubble for the root node 302 to begin bubbling from the terminal nodes upwards:
bubble result as a In the present case, the bubble value (i.e. the "result") is the token assigned to current leaf, i.e. "1" as indicated by reference numeral 330 and "2" as indicated by reference numeral 332 and each ancestor node receive the bubble which contains an array of tokens. At the topmost node, the root node 302, 'contents', the following stream expression is generated/produced:
'Bubble contains' a
and would evaluate to:
'Bubble contains' '1' '2'

The elements within the array make up the stream expression and can be addressed or "sliced" by way of using index references. If the index of the desired array position is known, the value of a specific array element can be retrieved. For example the statement 'Bubble contains' a[0] would evaluate to 'Bubble contains' '1' in respect of parse tree 300. To extract a range of values, the bubble can be sliced. For example, the statement 'Bubble contains' a[1:] evaluates to 'Bubble contains' '2' in respect of parse tree 300.

The bubble action statement can be incorporated into a mutation script, and more specifically into a mutation rule, and evaluated at a node within the parse tree 300 as specified by the rule using the follow expressions:

```
at contents {
    bubble result as a
}
```

The above statement triggers a bubble action at the node "contents" to produce a stream expression called "result" and given the name 'a'.

In some embodiments, bubbles for a current parse tree node can be imported (a "bubble import") from nodes that are upstream or ascendant relative to that particular node. As noted previously, the normal mode bubble propagation is in the upwards direction along the parse tree structure. An upstream node receives combined bubbles sent from the downstream nodes. If necessary, a bubble import operation can be performed instead by bubbling token values from one or more upstream or ascendant node (i.e. in a downward direction). The incorporation of bubble import operations can simplify the writing of mutation rules, since the flow of token values is not restricted to movement in a single direction. Accordingly, the overall efficiency code translation procedure may be enhanced.

Figure 3D:
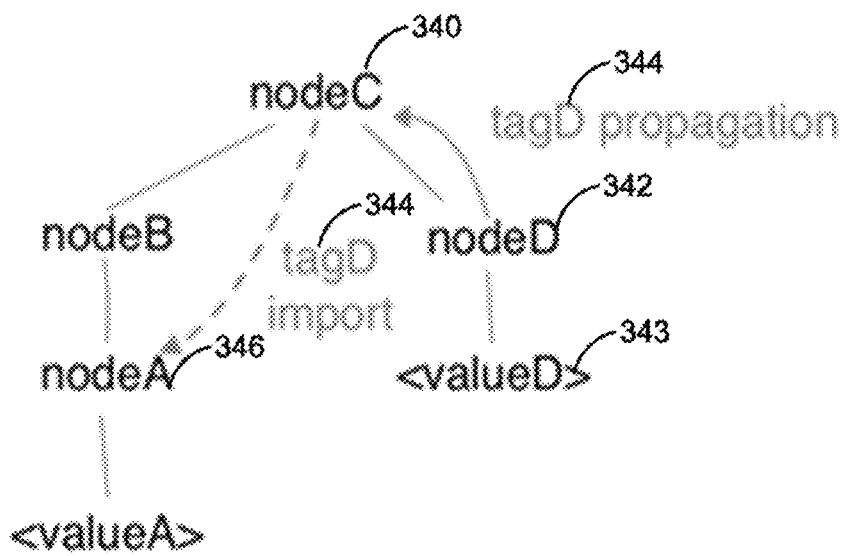
FIG. 3D is a graphical depiction of a bubble import operation.

For example, and with reference to the parse tree structure of FIG. 3D, certain mutations can applied where a bubble import operation may be invoked in accordance with the following statements in the mutation script:

```
at nodeA
  import tagD of nodeC
  when tagD detected {
    MRK: at position 0 remove remaining tokens
    then insert 'from node A' tagD
  }
at nodeD {
  bubble result as tagD
}
```

In the described example parse tree of FIG. 3D, in a default mode where no mutation rules are applied, the stream expression at the root node 340 labeled "nodeC" at the top of the tree would be [<valueA>, <valueD>]. The first rule alters this stream expression to ['from node A', <valueD>, <valueD>] since the following operations are performed according to the above code statements:
1. nodeD 342 bubbles its content as tagD 344, that is, tagD 344 has value of <valueD> 343;
2. nodeA 342 imports tagD 344 from nodeC 340 which is a common ancestor of both nodeA 346 and nodeD 342;
3. nodeA 342 detects that tagD 344 is defined at nodeC 340 and therefore the mutation rule within that code block is executed or "fired";
4. The content of nodeA 346 gets replaced to ['from node A', <valueD>] using the value captured in tagD 344;
5. At nodeC 340, the resulting stream expression becomes [' from node A', <valueD>, <valueD>] as both values get concatenated.

Source Text Translation Example

Figure 4:
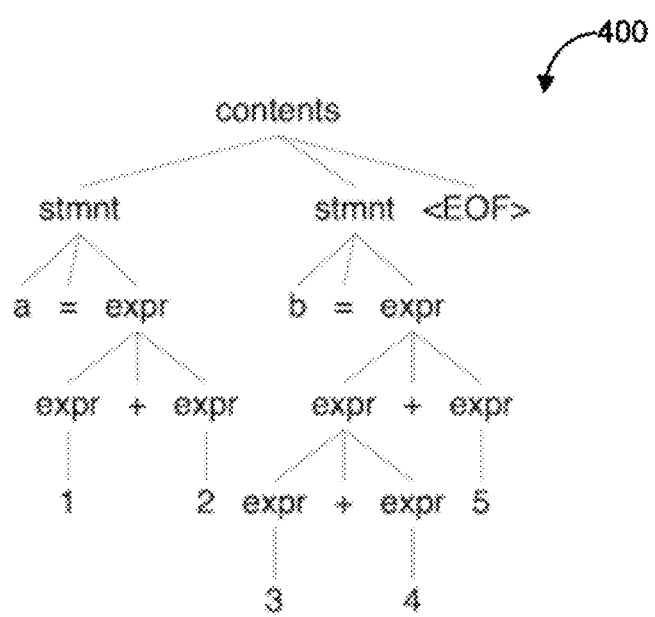
FIG. 4 is a second parse tree associated with a code translation example.

The following example illustrates the application of a mutation script to translate source text conforming to the grammar described above into Java code that evaluates and prints the result. The following input source text, conforming to the above-presented grammar, is provided follows:
a=1+2
b=3+4+5
The source file parser component 226 of FIG. 2 would be activated to parse the above input source text to generate a corresponding parse tree 400 as shown in FIG. 4

For the given source logic statement in the source text, the code mutator component 228 applies the following mutation script:

```
at stmnt {
  bubble result as stmnt;
}
at contents {
  LABEL: at position 0
    remove remaining tokens
    then insert 'public class Main {\n'
    '  public void main(String[ ] argv) {\n'
    stmnt(item ->
    '    int ' item ';\n'
    '    System.out.println("' item[0] '=" +
    item[0]'); \n'
    '  }\n'
    '}\n'
}
```

The above mutation script contains two mutation rules. Each rule begins with the keyword 'at' and identifies the name of a node that the particular rule is applicable to within a parse tree 400 that resulted from parsing the source text. The name of the node of parse tree 400 that the mutation rule is attached to comes after the 'at' keyword. In the present mutation script, the first rule is applicable to the node called "stmt" and the second rule is applicable to the node called "contents".

The rules in the above example mutation script do not contain any conditions (i.e. conditions prefixed by the keyword "when" for simplicity). However in other mutation rules various conditions can be imposed to determine whether the rule should be applied. In the present case, the mutation rule applicable to the node named stmnt executes a bubble action statement, and its bubble result is a stream expression provided as an array with name "stmnt" available for access at the root (i.e. topmost) node contents. This root node in turn reformats its output by discarding whatever was parsed in the input (this results from executing the statement "position 0 remove remaining tokens" of the script) and then inserts text conforming to Java syntax. Since the "stmnt" can contain an array of accumulated values (e.g. there are two instances in the given example), each value is iterated one by one, and the current instance is referred to as an "item".

Optionally, the portion of the mutator script that comes after the "insert" statement can be kept in a template as T_PRINT, as noted above, so that the insert statement can take the form: insert T_PRINT (items=>stmnt). The resulting mutation script becomes:

```
T_PRINT => 'public class Main {\n'
  '  public void main(String[ ] argv) {\n'
  items(item ->
  '    int ' item ';\n'
  '    System.out.println("' item[0] '=" + ' item[0]
  ');\n')
  '  }\n'
  '}\n'
at stmnt {
  bubble result as stmnt;
}
at contents {
  LABEL: at position 0
    remove remaining tokens
    then insert T_ PRINT( items => stmnt )
}
```

Upon application of the above mutation rules, the following output text in the Java language is produced:

```
public class Main {
  public void main(String[ ] argv) {
    int a = 1 + 2;
    System.out.println("a=" + a);
    int b = 3 + 4 + 5;
    System.out.println("b=" + b);
  }
}
```

Figure 5:
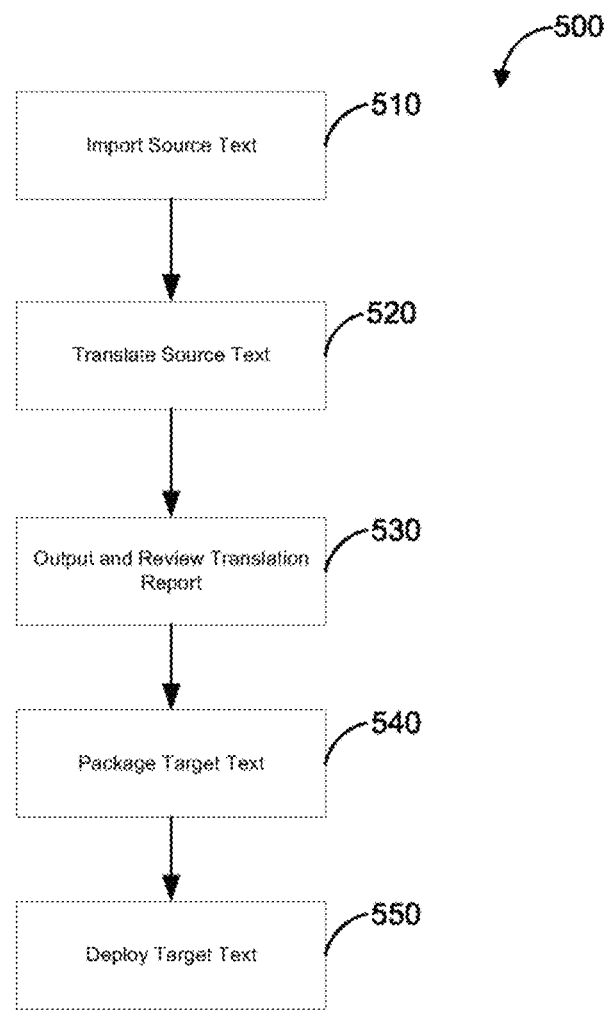
FIG. 5 is flowchart of a method to translate source text to target text using the mutator framework of FIG. 1.

FIG. 5 is a flowchart 500 outlining a method to translate source text to a target text for use in a target environment such as a big data environment using the mutator framework 210. As noted above, the mutator framework 210 can be accessed by way of a graphical user interface or using a command-line interface. Therefore the translation function can be accessed as needed in a flexible manner. The steps of FIG. 5 will is discussed also with reference to the elements of FIGS. 1 and 2.

At step 510, a user imports source text, such as source code in the source language used in the legacy data environment 102 of FIG. 1. Next, the target code language is specified by the user for translation of the source text. The source text may include source code for reporting procedures, data processing applications and the like that can be run within the legacy data environment 102.

At step 520, the source text is translated by the mutator framework 210 to the target text using the principles and methodologies described above. At step 530, upon completion of the translation process, a translation report is generated for the user to review. The report can be displayed within the GUI in a user dashboard or saved as a report document. The report includes identified discrepancies in the translation process that requires review by the user. During review, the user can make the corresponding modifications to the target text for which a discrepancy was identified. As noted previously, the inventors have found that the mutator framework 210 can automate translation of up to 80% of the imported code, thereby reducing the amount required for manual review. The modifications submitted for the purpose of addressing discrepancies can be used to create new translation rules for use in future translation sessions, to further increase translation coverage.

At step 540, the target text is then packaged and saved in a desired code repository. The code package can then be promoted and deployed at step 550 to a runtime environment The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A computer-implemented method to automatically translate a source code in a source programming language executable in a source computing system to a target programming language executable in a target computing system, the method comprising:
   parsing the source code according to a grammar file containing pre-defined grammars for the source programming language to generate a parse tree representing the source code, the parse tree having at least one node and at least one leaf, each of the at least one node and at least one leaf storing a token corresponding to part of the source code;
   traversing the parse tree along the at least one node and at least one leaf without modifying the parse tree;
   applying at least one mutation script to the parse tree during traversal of the parse tree, the mutation script comprising at least one mutation rule associating the pre-defined grammars for the source programming language with grammars for the target programming language, the mutation script directing that the following steps be performed:
      generating a stream expression, the stream expression defining a sequence of the tokens that are gathered from the parse tree into an array;
      formatting a text output according to a pre-formed code pattern and one or more placeholders specified within the at least one mutation rule; and
      based on the stream expression, inserting the gathered tokens into the text output at locations corresponding to the one or more placeholders (2) the at least one token of the stream expression; and
   code in the target programming language using the at least one text output.

2. The computer-implemented method of claim 1, further comprising the step of generating a translation report.

3. The computer-implemented method of claim 2, wherein the translation report comprises at least one instance of a translation discrepancy indicating that a logic statement of the source code in the source programming language does not have a corresponding mutation.

4. The computer-implemented method of claim 1, wherein the mutation script specifies the at least one mutation rule applicable to a specified node within the parse tree.

5. The computer-implemented method of claim 4, wherein generating the stream expression comprises performing a bubble action at the specified node that bubbles token data upward along the parse tree from descendant nodes to the specified node.

6. The computer-implemented method of claim 4, wherein generating the stream expression comprises performing a bubble import action at the specific node that imports token data from at least one ascendant node to the specified node.

7. The computer-implemented method of claim 4, wherein the mutation script is associated with a pair of target programming language and source programming language.

8. The computer-implemented method of claim 1, wherein traversing the parse tree comprises navigating the parse tree in a bottom-first, left-first order.

9. The computer-implemented method of claim 1, wherein the source code in the source programming language is not executable by the target computing system.

10. A system to automatically translate source code in a source programming language executable in a source computing system to a target programming language executable in a target computing system, the system comprising:
    a source file parser for parsing the source code according to a grammar file containing pre-defined grammars for the source programming language to generate a parse tree representing the source code in the source language, the parse tree having at least one node and at least one leaf, each of at least one leaf storing a token corresponding to part of the source code; and
    a code mutator for outputting the source code in the target programming language by traversing the parse tree along the at least one node and at least one leaf without modifying the parse tree and applying at least one mutation script to the parse tree during traversal of the parse tree, the mutation script comprising at least one mutation rule associating the pre-defined grammars for the source programming language with grammars for the target programming language, the mutation script directing that the following steps be performed:
       generating a stream expression, the stream expression defining a sequence of the tokens that are gathered from the parse tree into an array comprising at least one token corresponding to values associated with at least one of the one
       formatting a at least one text output according to the target language, the at least one text output text pattern a pre-form mutation rule; and
       based on the stream expression, inserting the gathered tokens into the text output at locations corresponding to the one or more placeholders (2) the at least one token of the stream expression;

code in the target programming language is outputted using the at least one text output.

11. The system of claim 10, further comprising a report generator for outputting a translation report.

12. The system of claim 11, wherein the translation report comprises at least one instance of a translation discrepancy indicating that a logic statement of the source code in the source programming language does not have a corresponding mutation.

13. The system of claim 10, wherein the mutation script specifies the at least one mutation rule applicable to a specified node within the parse tree.

14. The system of claim 13, wherein generating the stream expression comprises performing a bubble action at the specified node that bubbles token data upward along the parse tree from descendant nodes to the specified node.

15. The system of claim 13, wherein generating the stream expression comprises performing a bubble import action at the specified node that imports token data from at least one ascendant node to the specified node.

16. The system of claim 13, wherein the mutation script is associated with a pair of target programming language and source programming language.

17. The system of claim 10, wherein traversing the parse tree comprises navigating the parse tree in a bottom-first, left-first order.

18. The system of claim 10, wherein the source code in the source programming language is not executable by the target computing system.

* * * * *